United States Patent [19]

Bittenson et al.

[11] 4,120,767

[45] Oct. 17, 1978

[54] PHOTOCHEMICAL METHOD FOR CARBON ISOTOPIC ENRICHMENT

[75] Inventors: Steven N. Bittenson; Paul L. Houston, both of Ithaca, N.Y.

[73] Assignee: Cornell Research Foundation, Inc., Ithaca, N.Y.

[21] Appl. No.: 811,217

[22] Filed: Jun. 29, 1977

[51] Int. Cl.² ............................................. B01J 1/10
[52] U.S. Cl. ........................ 204/158 R; 204/DIG. 11
[58] Field of Search .................... 204/DIG. 11, 158 R

[56] References Cited

PUBLICATIONS

Jones et al., J. Mol. Specter, 58, 125–141 (1975).
Petersen et al., Optics Communications, 17 (1976) pp. 259–263.

*Primary Examiner*—Howard S. Williams
*Attorney, Agent, or Firm*—Jones, Tullar & Cooper

[57] ABSTRACT

In the process of the invention an isotopic starting material comprising at least two isotopic forms of $CF_3I$ and particularly a mixture of carbon-12 and carbon-13 isotopic species of $CF_3I$ is selectively isotopically enriched by means of a laser-induced photochemical dissociation followed by chemical combination to form a compound, such as an ethylenically unsaturated compound other than $CF_3I$. The chemical combination takes the form of recombination of dissociation fragments or the combination of the $CF_3$ radical with a scavenger compound. The separation is carried out by irradiating a gaseous mixture of the starting materials at a reduced pressure with laser radiation, until a significant enrichment in isotopic $CF_3I$ is achieved. The wavelength of the radiation is selected so as to selectively excite one of the $CF_3I$ isotopes, thereby causing the excited species to dissociate and form at least one chemical species other than $CF_3I$. The resulting mixture is enriched in selectively unexcited isotopic $CF_3I$ which can be separated from the reaction product mixture by conventional techniques.

20 Claims, 4 Drawing Figures

PHOTOCHEMICAL METHOD FOR CARBON ISOTOPIC ENRICHMENT

BACKGROUND OF THE INVENTION

There has been much recent interest in the development of various methods of isotopic separation or enrichment. Although much of this effort has been directed to the separation of uranium isotopes, pure or enriched isotopes of other elements are also desirable, for example, as tracer materials for medical research and diagnosis, biological research and environmental studies.

Multiphoton dissociation of molecules using intense infrared lasers has been the object of extensive investigation during the past few years (see Mukamel et al, *J. Chem. Phys.* 65, 5204 (1976) and Dever et al, *J. Am. Chem. Soc.* 98, 5055 (1976) as well as the references cited therein). An important application of this technique is to the separation of isotopically labeled molecules, as reviewed in several references (Mukamel et al and Dever et al supra; Walther "Atomic and Molecular Spectroscopy with Lasers", Topics in Applied Physics, Vol. 2, *Laser Spectroscopy*, (Walther, Ed.) Springer-Verlog, 1976; *Laser Spectroscopy*, Proceedings of the Second International Conference, Megeve June 23–27, 1975 (Haroche et al, Ed.), Springer-Verlog, 1975; Letokhov et al, *Sov. J. Quant. Electr.* 6, 129,259 (1976); and Aldridge III et al "Experimental and Theoretical Studies of Laser Isotope Separation", Physics of Quantum Electronics, Vol. 4, *Laser Photochemistry, Tunable Lasers, and Other Topics,* Jacobs et al, Ed., Addison-Wesley, 1976). Enrichment in the isotopes of H, B, C, Si, Cl, S and Os has been reported.

V.S. Letokhov, *Physics Today,* May 1977, pages 23–31, provides a review of the art including a tabular recitation of successful laser isotope separations including the separation of $C^{12}$ and $C^{13}$ by multiphoton dissociation of $CCl_4$. This reference also describes a pulsed TEA $CO_2$-He-$N_2$ laser which has been employed in laser isotope separations.

Another recent survey article of interest is R. N. Zare "Laser Separation of Isotopes", *Scientific American,* Feb. 1977, Vol. 236, No. 2, pages 86–98.

Multiphoton dissociation of $CCl_3F$ and $CF_3Cl$ has been reported by Dever et al supra. Dever et al used a focused $CO_2$ laser to obtain up to 1.6% conversion of the parent molecule per flash at about 60 torr of pressure. No investigation of the isotopic selectivity was reported.

Lyman et al, *J. Appl. Phys.* 47 595 (1976) have described enriching carbon-13 by mutliphoton dissociation of $CF_2Cl_2$ (Freon-12). The $^{13}C/^{12}C$ ratio of the starting material was increased by a factor of 1.65 by selectively dissociating $^{12}CF_2Cl_2$.

The invention described herein using $CF_3I$ offers several advantages over the processes shown in the above two references. $CF_3I$ can be dissociated at relatively low intensities. An unfocused TEA $CO_2$ laser gives sufficient power so that a measurable fraction of starting material can be dissociated in fewer than 100 shots at one torr in a reasonable cell volume. In addition, very high isotope separation factors may be achieved in $CF_3I$. In excess of 15% of the molecules in the beam can be dissociated per laser pulse at high intensities, and enrichment factors of nearly 600 have been obtained.

The interaction of low intensity $CO_2$ laser radiation with $CF_3I$ has been reported by Jones et al, *J. Mol. Spectr.* 58 125 (1975) and Petersen et al, *Opt. Commun.* 17, 259 (1976).

Photochemical isotopic enrichment techniques are based on two main phenomena. First, there is the fact that the wavelengths of spectral lines absorbed by a molecule depend somewhat on the isotopes present in the molecule. Second, the rate of a chemical reaction is sometimes influenced by the state of excitation of the participating molecules. In order for photochemical isotopic enrichment to be possible with a given starting material, several conditions must be satisfied. First of all, the effect of isotopic content of the starting material on the wavelengths of one or more of its spectral lines must be large enough so that one type of isotope-containing molecule could be preferentially excited by absorbing laser radiation which would not excite the other type of isotope-containing molecules. Secondly, a laser is needed whose radiation happens to match in wavelength one of the isotope-dependent lines, or a laser that can be tuned to such a wavelength, and the spectral width of the laser radiation must be narrow enough to excite molecules containing one of the isotopes and not the others. Thirdly, the recombination of the fragments selectively dissociated by the laser to form the original starting compound must be retarded or prevented. Fourthly, transfer of excitation from one molecule to another by collisions, and "scrambling" of isotopes through collisions of reaction products with other species must be negligible. Both these latter factors contribute to the overall selectivity of the process.

DESCRIPTION OF THE INVENTION

Figure 1:
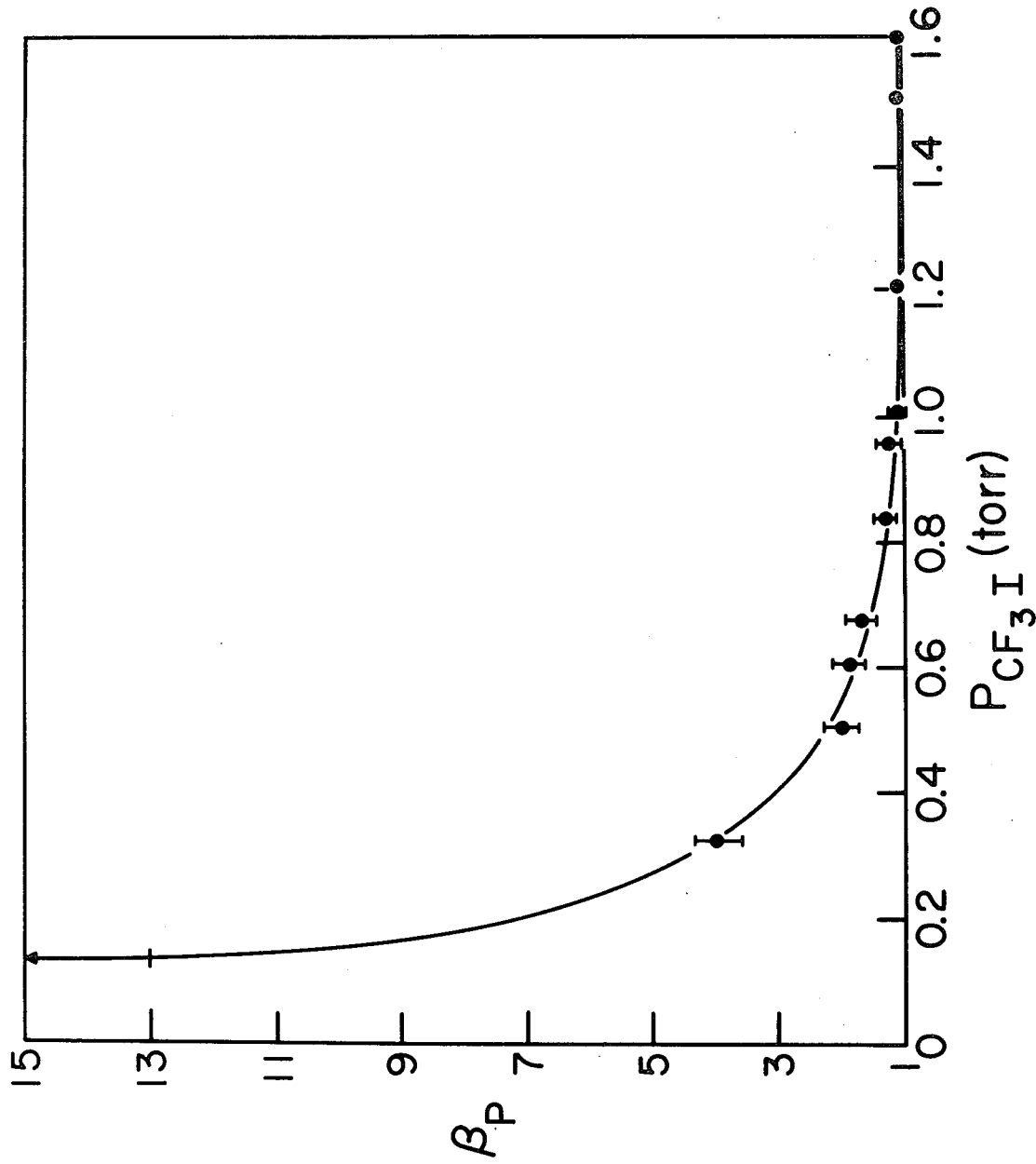
FIG. 1 plots experimental results showing the selectivity of product formation as a function of pressure at a laser intensity at 5.5 MW/cm$^2$.

It is accordingly a primary object of the present invention to provide a laser-induced photochemical method for carbon isotopic enrichment in an isotopic starting material containing at least two isotopic forms of carbon and preferably a mixture of carbon-12 and carbon-13 isotopic species which is capable of favorably satisfying the above described conditions.

Another object of the present invention is to provide a laser-induced photochemical method for carbon isotopic enrichment which permits selectivity in the isotopic species to be enriched.

A further object of the present invention is to provide a laser-induced photochemical method for the selective enrichment of either carbon-12 or carbon-13 isotopic content of a starting material containing each of these two isotopes.

Still another object of the present invention is to provide a laser-induced photochemical method for the selective enrichment of carbon isotopic starting material, wherein the reaction products formed during the course of the process are relatively stable.

Still a further object of the present invention is to provide a laser-induced photochemical method for the selective enrichment of carbon isotopic species in a carbon containing isotopic starting material, which results in appreciable yield of an isotopically enriched material.

The above and other objects are achieved in accordance with the method of the present invention in which an isotopic starting material comprising $CF_3I$ is subjected to a selective multiphoton dissociation process to enrich an isotopic carbon species thereof by selectively exciting an undesired isotopic species in admixture therewith.

In the presently preferred mode of the invention, an isotopic starting material comprising a mixture of carbon-12 and carbon-13 isotopic species of $CF_3I$ is selectively isotopically enriched in carbon-13 by means of a laser-induced photochemical dissociation of the carbon-12 species, followed by chemical combination to form a compound other than $^{12}CF_3I$. The chemical combination takes the form of recombination of dissociation fragments, or the combination of the $^{12}CF_3$ radical with a scavenger compound. The method is carried out by irradiating a gaseous mixture of the starting material at a reduced pressure with laser radiation at a wavelength between 9.317 microns and 9.282 microns until a significant enrichment in $^{13}CF_3I$ is achieved. The wavelength of the radiation is selected so as to selectively excite and dissociate the $^{12}CF_3I$ to form a chemical species other than $^{12}CF_3I$. The resulting mixture is enriched in selectively unexcited isotopic $^{13}CF_3I$ which can be separated from the reaction product mixture by conventional techniques.

The particular laser employed is not critical except that it must produce or be tunable to produce radiation which selectively excites molecules containing one of the isotopic $CF_3I$ molecules and has a spectral width narrow enough so that it does not excite the isotopic $CF_3I$ molecules sought to be enriched. In addition, the laser must have sufficient intensity to cause dissociation of isotopic $CF_3I$ to $CF_3 \cdot + I$. Preferably, the laser employed in the process of this invention should provide an intensity of at least about 1 to 2 $MW/cm^2$ (or at least an energy of about 0.12 to about 0.24 $Joules/cm^2$) and preferably an intensity of at least about 3.5 $MW/cm^2$ (0.42 $Joules/cm^2$). Most preferably, a laser intensity of at least about 5 $MW/cm^2$ (0.6 $Joules/cm^2$) is employed.

While a pulsed laser is exemplified, a continuous beam laser is also operable in the process of this invention.

The duration of irradiation should be sufficient to cause a measurable enrichment in the desired isotopic species. With the exemplified TEA $CO_2$ laser, about 200 shots are required. Obviously, laser intensity and power, and process temperature and pressure affect the time required. For any particular set of parameters, the necessary reaction duration is readily determined.

In order to achieve significant isotopic enrichment, it is necessary to reduce or prevent scrambling. In order to achieve this, the number of collisions during dissociation should be kept as low as possible, and preferably the number of dissociations per unit time should be greater than the number of collisions per unit time. One method of reducing scrambling is by the use of high intensity, short duration pulsed radiation. For example, laser radiation at an intensity of 10 $MW/cm^2$, with a duration of 10 nsec, will provide selectivity at relatively high partially pressures. However in the presently preferred embodiment, in order to reduce scrambling, the pressure, or at least the partial pressure of $CF_3I$, in the reaction zone should be less than about 1 torr, preferably this pressure should be less than about 0.5 torr. In practice, a pressure of about 0.1 torr has been found very useful.

While the dissociation reaction can occur over a wide range of temperatures, it is preferred that the reaction mixture be maintained under conditions such that at the particular temperature and pressure molecular $I_2$ condenses from the reaction mixture and/or has a low partial pressure so that the reaction $CF_3 \cdot + I_2 \rightarrow CF_3I + I$ is prevented or retarded, thus increasing the efficiency of the enhancement process. It has been found that cooling at least a portion of the reaction mixture at a pressure of less than 1 torr to about $-50°$ C. and preferably to about $-80°$ C. or less causes $I_2$ to condense upon the walls of the reaction zone. This is evidenced by the fact that after a desired degree of reaction when the gaseous reaction mixture is removed from the reaction zone, the gaseous reaction mixture contains little or no $I_2$, but a coating of $I_2$ remains behind on the cooled walls of the reaction zone. Cooling may be achieved in any practical manner, such as by the use of a jacket about the side walls of the reaction zone or by the cooling of side arms extending from or fingers extending into the reaction vessel.

For a better understanding of the selectivity of this process, the following parameters ($^{13}CF_3I$ enrichment) are of interest: Where $\beta_r$ is the ratio of reactant isotope abundances before and after irradiation:

$$\beta_r = [n_{13}/n_{12}]/[n_{13}(0)/n_{12}(0)] \tag{1}$$

where $n_{13}(n_{12})$ is the number density of $^{13}CF_3I$ ($^{12}CF_3I$) molecules and $N_i(0)$ refers to the initial number of the $i^{th}$ species. The laser preferentially dissociated $^{12}CF_3I$ so that $\beta_r$ increases as the bulk dissociation proceeds.

In a similar fashion, $\beta_p$ is defined as the isotope ratio in the products $P_{12}$ and $P_{13}$, compared to the ratio expected for a nonselective process:

$$\beta_p = [P_{12}/P_{13}]/[n_{12}(0)/n_{13}(0)] \tag{2}$$

Both $\beta_r$ and $\beta_p$ increases with increasing selectivity.

The parameters $\beta_p$ and $\beta_r$, whose values depend on the amount of laser energy applied, e.g., the number of pulses from a pulsed laser, are useful macroscopic indicators of the selectivity. The microscopic information concerning the selectivity is contained in the parameter $\alpha$, defined as follows: In the case where a pulsed laser is employed, after each laser pulse, small increments $dn_{12}$ and $dn_{13}$ of $n_{12}$ and $n_{13}$ are converted to products $P_{12}$ and $P_{13}$, respectively. The isotope ratio in this increment of products are given by $dn_{12}/dn_{13}$. Since a completely nonselective process will give an incremental isotope ratio equal to the current value of $n_{12}/n_{13}$, the macroscopic selectivity is measured by the parameter $$\alpha = [dn_{12}/dn_{13}]/[n_{12}/n_{13}] \tag{3}$$

If $^{12}CF_3I$ molecules are preferentially dissociated, than $\alpha$ will be larger than one.

If $f$ is defined to be the fraction of starting material remaining after irradiation of the sample with several pulses, $$f = [n_{12} + n_{13}]/[n_{12}(0) + n_{13}(0)] \approx n_{12}/n_{13}(0) \tag{4}$$

where the approximate holds for $n_{12} >> n_{13}$. Assuming that $n_{12} >> n_{13}$ and that $\alpha$ is constant during the course of the photolysis, the quantities of $f$, $\alpha$ and $\beta_r$ are related by the equation $$\beta_r = f \frac{1-\alpha}{\alpha} \quad (5)$$

Combination of Eqns (2) and (3) and integration from $f = 1$ to $f = f$ to obtain $\beta_p$ yields:

$$\beta_p = \frac{\alpha^2}{2\alpha - 1} \cdot [(1 - f^{\frac{2\alpha - 1}{\alpha}})/1 - f)]. \quad (6)$$

In principle, $\alpha$ may be calculated from $\beta_r$ and $f$, $\beta_p$ and $f$, or from $\beta_p$ and $\beta_r$.

Finally, to determine how $f$ varies with N, the number of laser pulses, it is assumed that the fraction of CF$_3$I dissociated in the beam per pulse, $\Delta f$ is constant throughout the irradiation. Then, for a cell of volume $V_c$ and a homogeneously irradiated volume $V_{irr}$, $\Delta f$ is related to $f$ by $$f = (1 - r\Delta f)^N \quad (7)$$

where $r = V_{irr}/V_c$ and N is the total number of laser pulses. (With reference to the above theoretical discussion, see Lyman et al, *J. Appl. Phys.* 41, 595 (1976).)

Examining the kinetics of the process of the invention, it has been shown that the CF$_3$ and I radicals formed by multiphoton dissociation of CF$_3$I recombine to yield CF$_3$I, C$_2$F$_6$ and I$_2$. These are only species observed in either infrared or mass spectra of samples irradiated at intensities below 25 MW/cm$^2$. In particular, CF$_2$I$_2$ and other products which arise from breaking a C-F bond are not observed. There is proposed below a simplified kinetic scheme for the purpose of discussing major features in the results. This scheme is sufficient for that description but is by no means complete.

$$CF_3I + p\, h\nu \xrightarrow{k_8} CF_3I^* \quad \text{excitation} \quad (8)$$

$$CF_3I^* + q\, h\nu \xrightarrow{k_9} CF_3 + I \quad \text{dissociation} \quad (9)$$

$$^{12}CF_3I^* + {}^{13}CF_3I \underset{}{\overset{k_{10}}{\rightleftharpoons}} {}^{12}CF_3I + {}^{13}CF_3I^* \quad \begin{array}{c}\text{collisional}\\\text{scrambling}\end{array} \quad (10)$$

In these equations $p$ and $q$ are integral numbers of photons totalling enough energy to break the C-I bond ($\Delta H_{298}^\circ = +55$ kcal/mole; $p + q \gtrsim 18$ photons). Equations (8) and (9) may actually consist of several individual steps.

Dissociation is followed by recombination of radicals to yield products or reactants:

$$CF_3 + CF_3 \rightarrow C_2F_6 \quad (11)$$

$$CF_3 + I \rightarrow CF_3I \quad (12)$$

$$I + I\, (+M) \rightarrow I_2\, (+M) \quad (13)$$

Two other radical reactions are also of importance:

$$CF_3 + I_2 \rightarrow CF_3I + I \quad (14)$$

$$^{12}CF_3 + {}^{13}CF_3I \rightleftharpoons {}^{12}CF_3I + {}^{13}CF_3 \quad (15)$$

In an alternative embodiment, the starting isotopic CF$_3$I is admixed with an ethylinically unsaturated organic compound reactive with the CF$_3$· radical or isotopically selectively excited CF$_3$I through the unsaturation, and which has an appreciable vapor pressure at the pressure and temperature employed in the reaction zone and which also is not disproportionated by the laser beam employed. The presently preferred ethylinically unsaturated compound is ethylene. In a reaction mixture where the unsaturated compound is present, the following reactions are believed to occur:

$$*CF_3I \rightarrow *CF_3\cdot + I$$

$$*CF_3\cdot + CH_2=CH_2 \rightarrow *CF_3CH_2CH_2\cdot$$

$$*CF_3CH_2CH_2\cdot + I \rightarrow *CF_3CH_2CH_2I$$

There follows a number of examples which set forth specific embodiments of the invention. These examples are to be considered illustrative, rather than limiting and all parts and percentages are by weight unless otherwise specified. All temperatures are degrees centigrade unless specified.

EXAMPLES 1-24

The following examples show the enrichment of $^{13}$CF$_3$I.

CF$_3$I dissociation was achieved employing CF$_3$I with a natural $^{12}$C/$^{13}$C distribution, i.e. about 99/1. The laser used was a grating tuned CO$_2$ TEA laser (Tachisto Corporation Model 215 laser head — Tachisto Corporation, Needham, Mass.) producing a maximum of 1 joule single line output in 60 ns. fwhm. In several experiments, including Runs 13 and 14, a 30 cm. focal length sodium chloride lens was used to focus the radiation through polished NaCl windows into cylindrical Pyrex sample cells. The dimensions of the cells were adjusted to meet the requirements of individual experiments. Cell lengths ranged from 5 cm. to 30 cm., when focusing was used and from 5 cm. to 114 cm. when the laser was used unfocused. Species indentification, concentrations, and isotope ratios were determined with a Perkin Elmer Model 521 grating infrared spectrometer and a Consolidated Engineering Corporation type 21-103A mass spectrometer.

Laser power was measured with a Scientech Model 360001 laser power meter. The pulse intensity was taken to be one-half of the measured energy per pulse in 60 nanoseconds over the mean irradiated area of a sample. Beam areas were recorded on thermal sensing paper stock and were not corrected for laser mode structure or external diffraction effects. An intracavity aperture near the output mirror was used to restrict lasing to low order transverse modes, and an external aperture was generally used to reduce the beam area to 0.5 cm$^2$.

The following table summarizes twenty-four experiments using the equipment and conditions described:

TABLE I

| Run | CF$_3$I Pressure (torr) | Laser Intensity (MW/cm$^2$) | $\beta_r$ | $\beta_p$ | $f^b$ | $r^c$ | $\Delta f$ | $\alpha$ | $E_{abs}$ (h$\gamma$/mol) | Eff. (%) | N |
|---|---|---|---|---|---|---|---|---|---|---|---|
| | 0.14$^d$ | 5.5 | 1.7 | >13 | 0.77 | 0.86 | <.001 | >13 | | | 400 |

TABLE I-continued

| Run | $CF_3I$ Pressure (torr) | Laser Intensity ($MW/cm^2$) | $\beta_r$ | $\beta_p$ | $f^b$ | $r^c$ | $\Delta f$ | $\alpha$ | $E_{abs}$ (hv/mol) | Eff. (%) | N |
|---|---|---|---|---|---|---|---|---|---|---|---|
| 2 | 0.15 | 5.5 | 1.5 | > 8 | 0.75 | 0.86 | <.001 | > 8 | | | 400 |
| 3 | 0.32 | 5.5 | 1.0 | 4 | 0.95 | 0.86 | <.001 | 4 | | | 170 |
| 4 | 0.50 | 5.5 | 1.0 | 2 | 0.95 | 0.86 | <.001 | 2 | | | 100 |
| 5 | 0.60 | 5.5 | | 1.9 | | 0.86 | | 1.9 | | | 200 |
| 6 | 0.67 | 5.5 | 1.0 | 1.7 | 0.94 | 0.86 | <.001 | 1.7 | | | 170 |
| 7 | 0.83 | 5.5 | 1.0 | 1.3³ | 0.92 | 0.86 | <.001 | 1.3 | | | 170 |
| 8 | 0.95 | 5.5 | | 1.2³ | | 0.86 | | 1.2 | | | 100 |
| 9 | 1.00 | 5.5 | 1.0 | 1.1² | 0.92 | 0.86 | .001 | 1.1 | | | 100 |
| 10 | 1.20 | 5.5 | | 1.1¹ | | 0.86 | | 1.1 | | | 100 |
| 11 | 1.50 | 5.5 | | 1.0⁸ | | 0.86 | | 1.1 | | | 100 |
| 12 | 5.00 | 5.5 | 1.0 | 1.0² | 0.73 | 0.86 | .004 | 1.0 | | | 100 |
| 13 | 0.15$^e$ | 25(max) | 180 | 5.3 | 0.02 | 0.078 | .05 | 9.8 | | | 1000 |
| 14 | 0.10$^e$ | 25(max) | 590 | 6.4 | 0.015 | 0.078 | .03 | 12 | | | 2000 |
| 15 | 0.10$^e$ | 3.5 | 8.1 | >25 | 0.20 | 0.414 | .004 | >41 | | | 1080 |
| 16 | 0.50 | 0.8 | | | 1. | .077 | 0 | | 2.⁶ | 0 | 200 |
| 17 | 0.50 | 1.5 | | | 0.99 | .077 | .001 | | 4.⁷ | 0.3 | 200 |
| 18 | 0.50 | 3.3 | | | 0.90 | .077 | .007 | | 8.¹ | 1.5 | 200 |
| 19 | 0.50 | 5.2 | | | 0.56 | .077 | .038 | | 11.² | 6.1 | 200 |
| 20 | 0.50 | 6.1 | | | 0.65 | .042 | .051 | | 12.³ | 7.5 | 200 |
| 21 | 0.50 | 7.0 | 1.7 | 4.4 | 0.45 | .077 | .052 | 5.7 | 13.² | 7.1 | 200 |
| 22 | 0.50 | 10 | 1.6 | 4.7 | 0.63 | .011 | .084 | 5.6 | 16.⁶ | 9.1 | 500 |
| 23 | 0.50 | 13 | 3.2 | 4.0 | 0.33 | .042 | .13 | 5.6 | | | 200 |
| 24 | 0.50 | 16 | 1.9 | 3.6 | 0.59 | .007 | .15 | 4.3 | | | 500 |

Figure 2:
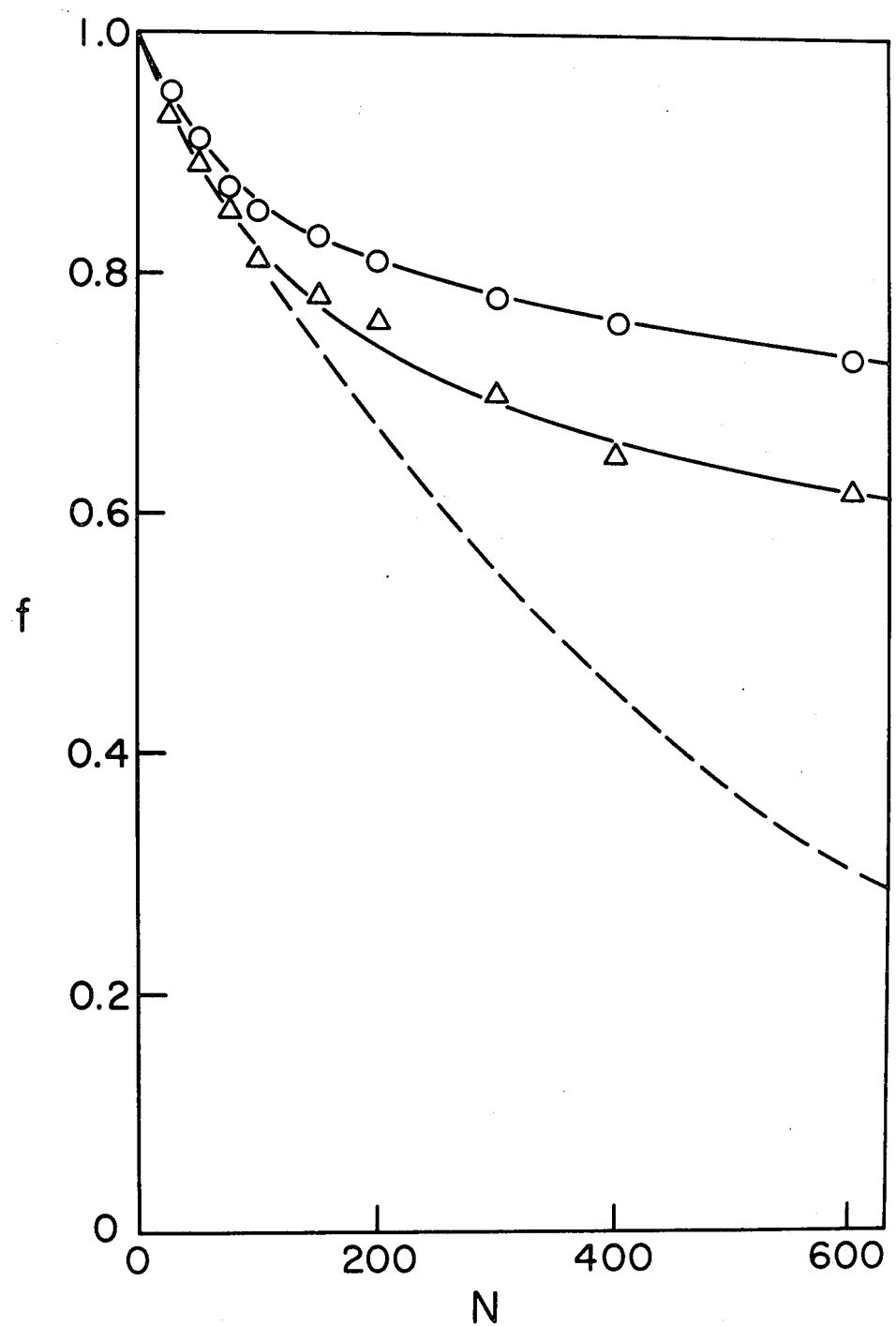
FIG. 2 plots experimental results showing the remaining fraction of $CF_3I$ as a function of the number of laser pulses and cell temperature.
Figure 3:
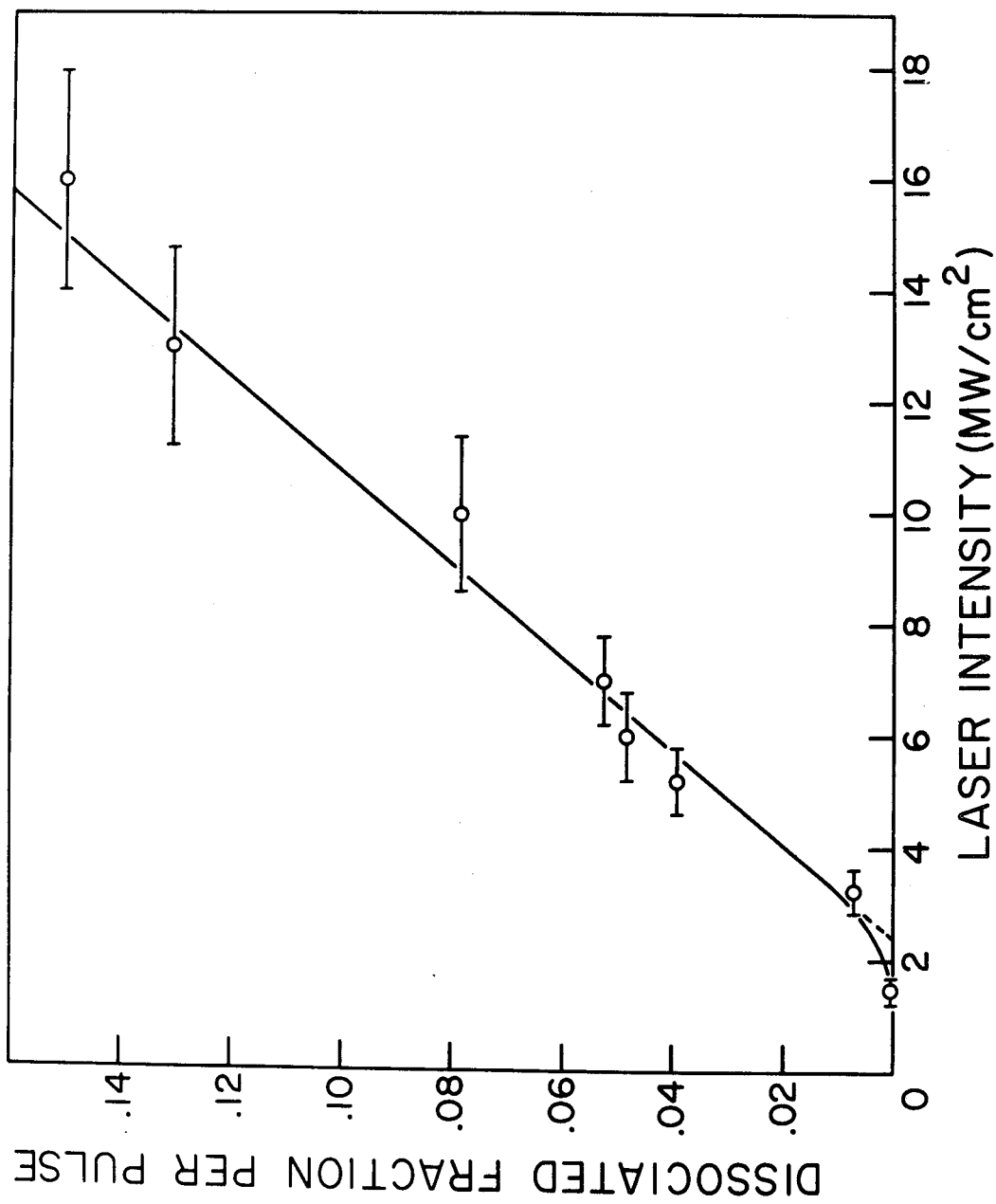
FIG. 3 plots experimental results showing the fractional dissociation in the laser beam per pulse as a function of laser intensity.

$^a$For dissociation with the R(14) line of the 9.6 μ $CO_2$ laser transition.
$^b f=(^{12}CF_3I + ^{13}CF_3I)/(^{12}CF_3I + ^{13}CF_3I)$ initial
$^c r=V_{ir}/V$
$^d$MeOH-$LN_2$ slush on side arm
$^e$—80° C dry ice jacket on cell Attention is directed to FIGS. 1–3 which plot experimental results. FIG. 1 plots the selectivity of product formation as a function of pressure at a laser intensity of 5.5 $MW/cm^2$. FIG. 2 plots the remaining fraction of $CF_3I$ as a function of the number of laser pulses and cell temperature: $T=298K$ (circles) and $T=-80°$ C. (triangles). The dashed line is the prediction of equation 7, above. FIG. 3 plots the fractional dissociation in the beam per pulse, $\Delta f$, as a function of laser intensity. The pressure of $CF_3I$ was 0.5 torr.

EXAMPLE 25

Figure 4:
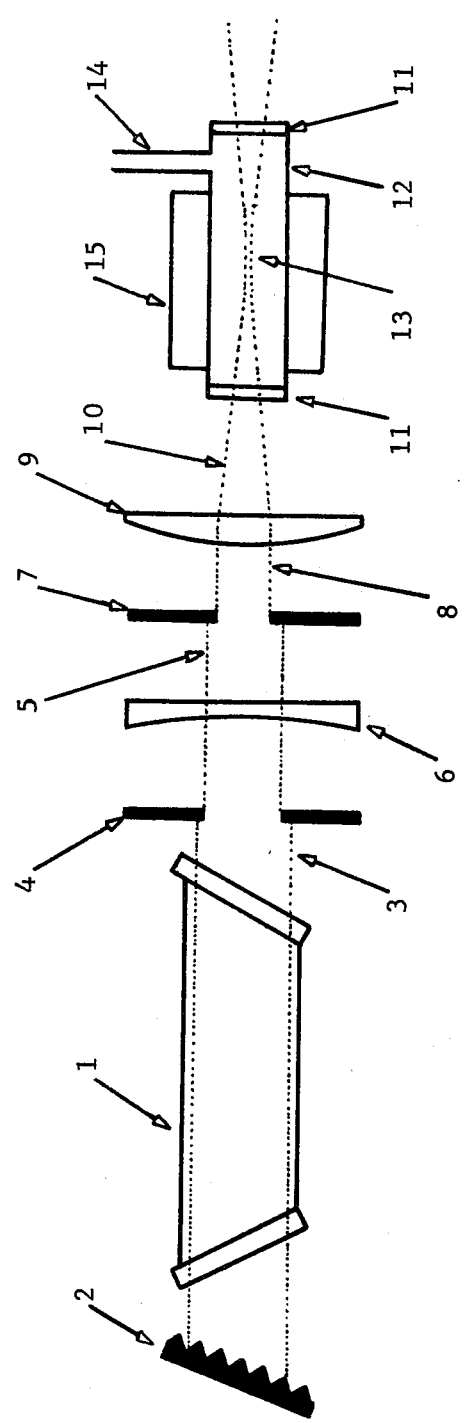
FIG. 4 is a schematic representation of the apparatus employed in the Examples.

Using the apparatus described in the previous examples, as schematically represented in FIG. 4 where the TEA $CO_2$ laser 1, was tuned by the grating 2 to the R(14) line of the 9.6μ$CO_2$ laser band, with the transverse mode of beam 3, restricted by an intracavity aperture 4, to form beam 5, which emerged from the cavity through 50% mirror 6, and passed in turn through the external aperture 7 to form beam 8, which was focused by lens 9 to form beam 10 which provides a peak intensity of 25 $MW/cm^2$ at the center point 13 of a 30 cm cell 12 with sodium chloride windows 11; when the cell was charged through feed tube 14 with naturally occurring $CF_3I(^{13}C/^{12}C \approx 1/99)$ at 0.10 torr, maintained at $-80°$ C. with a Dry Ice jacket 15 and irradiated with 2000 pulses (0.5$H_z$) (60 nsec. fwhm.), mass spectral analysis showed a 590 fold enrichment of $^{13}CF_3I$.

While the above description of the invention has been primarily concerned with the enrichment of $^{13}CF_3I$, the invention is equally applicable to the enhancement of $^{12}CF_3I$ by the use of a laser beam having a wavelength between about 8.3 microns and about 8.6 microns, preferably about 8.5 microns, which selectively excites $^{13}CF_3I$ in the manner described above to provide enrichment in $^{12}CF_3I$.

In a similar fashion it is to be noted that the selective excitation of $^{12}CF_3I$ provides enrichment of $^{14}CF_3I$. If desired, the laser wavelength may be chosen so that $^{14}CF_3I$ can be enriched relative to any $^{13}CF_3I$ in admixture therewith.

While the invention has been exemplified above in what is now considered its best embodiments, it is to be understood that, within the scope of the above disclosure, the equipment and process conditions can be varied from those specifically described while still obtaining results within the scope of this invention.

We claim:

1. A photochemical method for selective carbon isotopic enrichment in a starting material comprising a gaseous mixture of at least two isotopic $CF_3I$ species which comprises irradiating a gaseous isotopic mixture comprising said $CF_3I$ at a pressure below about 10 torr in a reaction zone with laser radiation having an energy of at least about 0.1 joule/$cm^2$ and having a wavelength selectively coinciding with the absorption band of one but not the other of said $CF_3I$ species, thereby selectively exciting and disproportionating said one species and causing it to form a reaction product other than said one species to provide relative enrichment of said other species; continuing said irradiation for a period of time to cause significant relative enrichment of said other species; and recovering from the gaseous phase in said reaction zone unreactive isotopic starting material enriched in said other species.

2. The method of claim 1 wherein the partial pressure of the isotopic $CF_3I$ starting material in said gaseous mixture is below about 1 torr.

3. The method of claim 2 where said partial pressure is about 0.1 torr.

4. The method, as in claim 2, where the temperature is sufficiently low, at the particular pressure employed to cause $I_2$ to condense from the irradiated gaseous mixture.

5. The method, as in claim 3, where the temperature of at least a portion of the reaction zone is maintained at below about $-70°$ C.

6. The method, as in claim 5, where the laser radiation energy is at least about 0.42 joule/$cm^2$.

7. The method of claim 6 wherein the partial pressure of the isotopic $CF_3I$ starting material in said gaseous mixture is below about 1 torr.

8. The pressure of claim 7 where said partial pressure is about 0.1 torr.

9. The method, as in claim 7, where the temperature is sufficiently low, at the particular pressure employed to cause $I_2$ to condense from the irradiated gaseous mixture.

10. The method, as in claim 8, where the temperature of at least a portion of the reaction zone is maintained at below about $-70°$ C.

11. The method, as in claim 6, where $^{12}CF_3I$ is said one excited species and $^{13}CF_3I$ is said enriched other species.

12. The method of claim 11 wherein the partial pressure of the isotopic $CF_3I$ starting material in said gaseous mixture is below about 1 torr.

13. The method of claim 12 where said partial pressure is about 0.1 torr.

14. The method, as in claim 12, where the temperature is sufficiently low, at the particular pressure employed to cause $I_2$ to condense from the irradiated gaseous mixture.

15. The method, as in claim 13, where the temperature of at least a portion of the reaction zone is maintained at below about $-70°$ C.

16. The method, as in claim 10, where the laser radiation has a wavelength between about 9.317 microns and about 9.282 microns.

17. The method, as in claim 11, where the laser radiation is the R(14) line of a 9.6$\mu$ $CO_2$ laser band.

18. A photochemical method for the selective carbon isotopic enrichment in a starting material comprising a gaseous mixture of at least two isotopic $CF_3I$ species which comprises irradiating a gaseous isotopic mixture comprising said $CF_3I$ and an ethylinically unsaturated compound relative with a $CF_3$· radical or isotopically selectively excited $CF_3I$ and inert to the radiation applied, at a partial pressure below about 10 torr, in a reaction zone with laser radiation having an intensity of at least about 1 MW/cm$^2$ and having a wavelength selectively coinciding with the absorption band of one but not the other of said $CF_3I$ species, thereby selectively exciting said one species and causing $CF_3$- and I-substituents to be added across the double bond of said ethylinically unsaturated compound to form a reaction product to provide relative enrichment of said other species; continuing said irradiation for a period of time to cause significant relative enrichment of said other species; and recovery from the gaseous phase in said reaction zone unreactive isotopic starting material enriched in said other species.

19. The method, as in claim 18, where the excited species is $^{12}CF_2I$ and the unsaturated compound is ethylene and the reaction product is $^{12}CF_3CH_2CH_2I$.

20. The method as in claim 18 where the partial pressure is below about 1.5 torr.

* * * * *